INVENTORS
Robert Maxwell Seddon
David William Brougham
by Benj. T. Chamber
their attorney

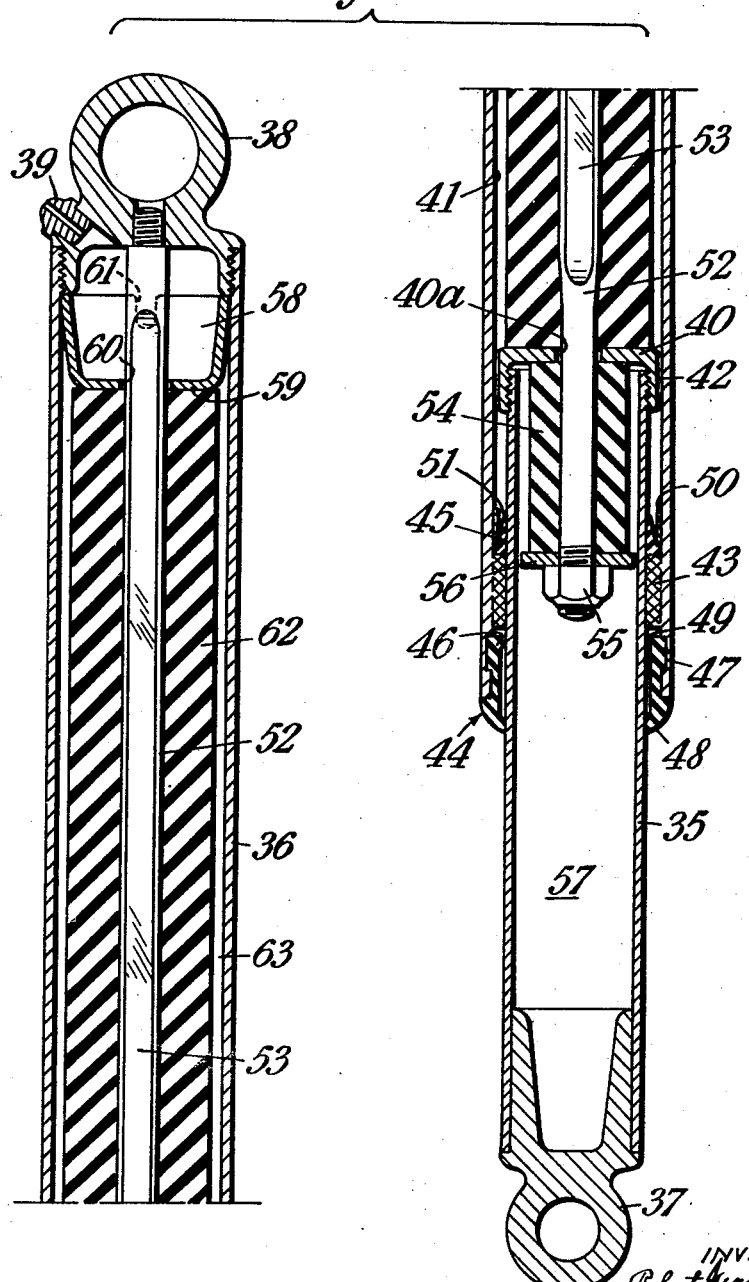

United States Patent Office 2,708,112
Patented May 10, 1955

2,708,112
SHOCK ABSORBERS

Robert Maxwell Seddon, Sutton Coldfield, and David William Brambani, Birmingham, England, assignors to Dunlop Rubber Company Limited, London County, England, a British company Application October 16, 1951, Serial No. 251,502

5 Claims. (Cl. 267—63)

This invention relates to shock absorbers and more particularly to self-oiling shock absorbers incorporating a compressible hollow-section rubber cushioning element or elements mounted coaxially on a supporting member.

In our co-pending application Serial No. 98,420, filed June 6, 1949, now Patent No. 2,683,044, issued July 6, 1954, and in British Patent No. 660,135 a shock absorber is described in which the rubber cushioning elements, carried coaxially on a plunger, are lubricated by movement of the shock absorber which causes an end of the plunger to displace oil from a reservoir and to deliver it to the elements. Thus the rubbing surface formed by the plunger and the elements is lubricated. Separate means are provided for lubricating relatively slidable members of the shock absorber.

It is desirable from the point of view of both maintenance and simplicity of construction that a single lubricating system should be provided for both purposes.

It is an object of the present invention to provide a self-oiling shock absorber wherein both the rubber elements and the relatively slidable members are automatically lubricated from a single source.

It is a further object of the invention to provide a self-oiling shock absorber the construction of which facilitates topping-up of the oil source.

According to the invention a shock absorber comprises inner and outer hollow-section telescopic members adapted to be connected to members subject to relative displacement, the members being maintained in spaced apart relationship by means of a bearing and the inner member constituting an oil sump, means for replenishing the sump, a member located coaxially within the outer member and extending into the inner member through a clearance hole in the inner end thereof, means for limiting extension of the shock absorber, a hollow-section rubber cushioning element forming a close fit around the supporting member and spaced apart from the inner wall of the outer member, the said element being located between the inner end of the inner member and the end of the outer member remote therefrom and a spacing member adjacent the end of the cushioning element remote from the inner member, said spacing member providing a passageway for flow of oil between the inside of the said element and the space between said element and the outer member.

Preferably the spacing member comprises a rigid cup-shaped oil reservoir provided on its periphery with overflow slots.

Preferably also the outer member is provided with an annular abutment located between and the inner and outer members which engages a rigid annulus located between the cushioning element and the inner end of the inner member in order to compress the cushioning element when the shock absorber is extended.

In one form of construction the rigid annulus is provided on one side with an annular recess which accommodates an end of the cushioning element and on its other side with an annular recess which accommodates an annular sealing pad adapted to form an oil-tight seal on the inner end of the inner telescopic member. The rigid annulus forms a clearance fit with the inner wall of the outer member and the annulus is provided with axially extending grooves.

During contraction of the shock absorber the annular sealing pad forms a seal against the end of the inner member and during extension of the members the annular abutment engages the rigid annulus and moves the sealing pad out of sealing relationship with the inner member. Any topping-up oil located in the space then flows from the space, between the clearance provided between the rigid annulus and the inner wall of the outer member, along the grooves provided in the annulus and into the sump through the clearance hole for the supporting member provided in the inner end of the inner member.

The invention will now be described with reference to the accompanying drawings in which:

Figure 3 shows a cross-sectional side elevational view of an alternative shock absorber.

Figure 1:
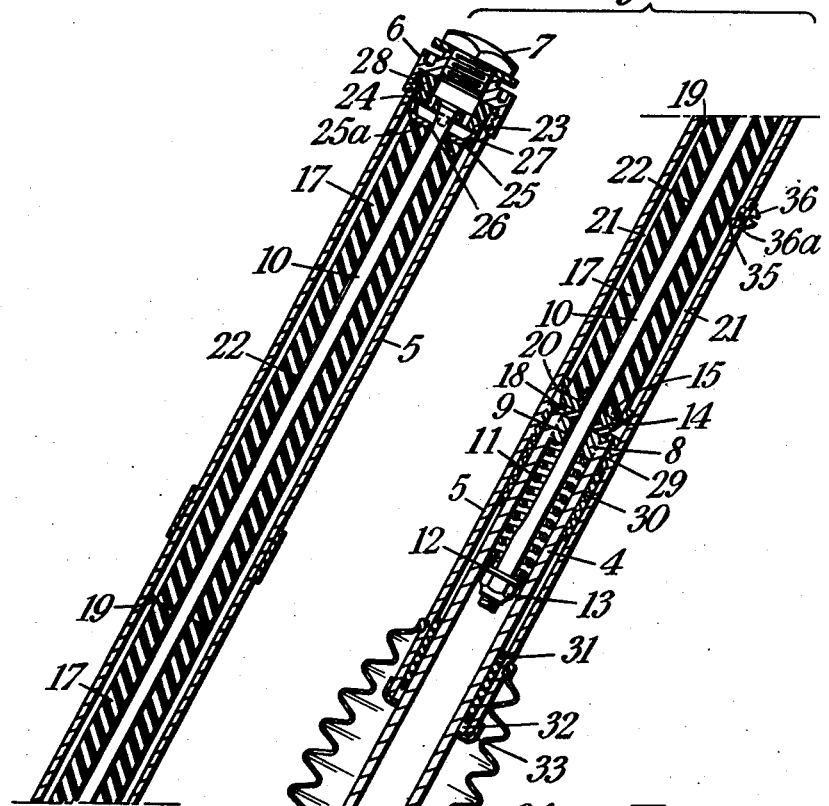
Figure 1 shows a cross-sectional side elevational view of a shock absorber.

The shock absorber illustrated in Figure 1 is suitable for the front suspension strut of a motor cycle and is provided at one end with a lug 1 having diametrically opposite radially projecting flanges 2 and 3, the flange 2 providing a means for attaching a front wheel to the shock absorber and the other flange 3 providing a means for securing a mudguard strut thereto. The other end of the shock absorber is adapted to be rigidly attached to the head fitting of a motor cycle.

The shock absorber will now be more particularly described and comprises telescopic cylindrical inner and outer members 4 and 5 respectively, the outer end of the inner member being closed by the aforementioned lug 1 so as to form an oil sump 4a and the outer end of the outer member being provided with an internal screw-thread for accommodating a screw-threaded annular cap 6. The annular cap is provided with an internal screw-thread which accommodates a screw-threaded end plug 7. The inner member is provided with an annular plug 8 which is rigidly welded to its end remote from the lug 1, the bore 9 of the plug accommodating a supporting rod 10 which forms a clearance fit therein. The supporting rod extends along substantially the whole length of the outer member 5 and for a distance of about 2 inches into the inner member 4 and carries at that end a helical compression spring 11, one end of which abuts the annular plug 8, the other end abutting a washer 12 held in position by a hexagon nut 13 carried by a screwthreaded end of the supporting rod 10.

Figure 2:
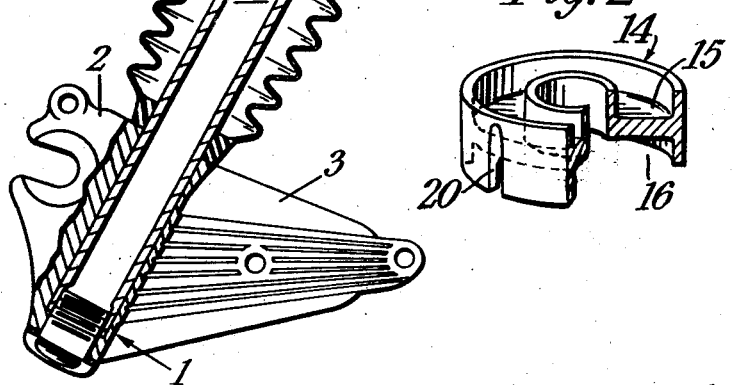
Figure 2 shows an isometric part-sectional view of a rigid annulus incorporated in the shock absorber shown in Figure 1.

A metal annulus 14 is slidably mounted coaxially on the supporting rod 10 adjacent to the annular plug 8 (see both Figure 1 and Figure 2), the annulus being provided with annular recesses 15 and 16 one on each side, the recess 16 accommodating a sealing pad 18 for sealing against the annular plug 8 and the other recess 15 accommodating a tubular rubber cushioning element 17 which will be more particularly described hereinafter. The annulus 14 forms a clearance fit with the inner wall 19 of the outer member 5 and is also a clearance fit on the supporting rod 10. The annulus is also provided with four axially extending grooves 20 of gradually increasing depth which extend from a point adjacent to the end of the annulus having the recess 15 to the other end of the annulus. At this end of the annulus the groove runs into the recess 16 provided for the sealing pad 18.

The tubular rubber cushioning element 17 is made up from two tubular portions placed end to end. The inside diameter of each of the portions is smaller than the diameter of the supporting rod when the portions are in an uncompressed state prior to assembling on the supporting rod. Thus the rubber element grips the supporting rod when assembled thereon and when in an uncompressed state. The outside diameter of each of the portions is smaller than the inside diameter of the outer telescopic member 5 so than an annular clearance space 21 is provided along which the oil may pass as will be more particularly described hereinafter.

The supporting rod 10 is provided with a flat surface 22 which extends coaxially from the end of the supporting rod located in the outer member to a point adjacent to the end carrying the fixing nut 13. The end of the supporting rod located in the outer member 5 carries a disc abutment 23 provided with axially extending holes 24 and riveted to the end of the supporting rod. This disc abutment 23 retains a cup-shaped oil reservoir 25 on the end of the rod, the reservoir being located coaxially thereon by means of a clearance hole 26 provided in its base 25a. The reservoir is provided with four equally spaced overflow slots 27 formed on its rim. The end of the cushioning element 17 remote from the metal annulus 14 abuts the base 25a of the reservoir. An annular rubber buffer 28 is located between the disc abutment 23 and the cap 6 screwed on the end of the outer member.

The outer member is provided with an annular abutment 29 which is welded to its inner wall 19 and adapted to contact and to provide an abutment for the metal annulus 14 mounted coaxially on the supporting rod 10. A clearance is provided between the annular abutment 29 and the outer wall of the inner member 4. A pair of annular bearings 30 and 31 is provided for the location of the inner member relative to the outer member and an oil seal 32 is located on the end of the inner member adjacent to the lower annular bearing 31. A force fitted cap 33 fits over the end of the inner member and retains the seal in position adjacent to the lower annular bearing.

Rubber bellows 34 are attached to the inner member adjacent to the lug 1 and to the outer member adjacent to the lower bearing 31 so that the bearing surfaces may be kept free from dirt and grit which may come into contact with them during operation of the shock adsorber.

An oil level hole 35 is provided in the wall of the outer member about 3" above the annular abutment, this hole being provided with a sealing screw 36 and sealing washer 36a.

The operation of the shock absorber just outlined will now be described, first of all when the inner and outer members 4 and 5 are telescoped. For this purpose it will be convenient to assume the inner member 4 to be fixed and the outer member 5 to move relative thereto. When this occurs the rubber cushioning element 17 is compressed between the oil reservoir 25 and the metal annulus 14, the sealing pad 18 located in the annular recess 16 forming a seal with the plug 8 located in the end of the inner member. The annular abutment 29 attached to the outer member moves away from the annulus 14 in this instance and does not come into operation. When the cushioning element 17 is compressed both the inside and the outside diameters of the two portions of the element increase so that a space is formed between the supporting rod 10 and the cushioning element 17. The supporting rod 10, which moves downwardly into the inner member so that the compression spring 11 moves clear of the annular plug 8, displaces oil from the sump 4a. The oil flows through the clearance space between the plug 8 and the rod 10 and into the space formed between the rod and the compressed cushioning element. When the shock absorber recoils to its original position some of the oil located in this space is transferred into the oil reservoir 25 by the contraction of the space. When the level of the oil in the reservoir 25 exceeds a predetermined level, the excess oil flows through one or the other of the slots 27 formed on the rim of the reservoir and runs down the annular space 21 formed between the outer member 5 and the cushioning element 17 and flows into contact with the metal annulus 14. On account of the clearance provided between the annulus and the inner wall of the outer member, oil may flow between the annulus and the outer member, down the grooves 20 and past the annular abutment 29 into contact with the annular bearings 30 and 31 so as to provide for their lubrication.

The operation of the shock absorber upon extension will now be described and for this purpose the inner member 4 will be considered to be fixed while the outer member 5 moves. When this occurs the annular abutment 29 locates with the metal annulus 14 which moves the bottom end of the rubber cushioning element 17 upwardly relative to its other end which is restrained by the annular disc 23 and supporting rod 10, the disc 23 forming an abutment for the cushioning element. Movement of the supporting rod 10 is limited by the compression spring 11 which locates with the annular plug 8. Thus, when the outer member moves so as to extend the shock absorber, the cushioning element is compressed between the metal annulus 14 and the annular disc 23 and the compression spring 11 is simultaneously compressed.

The annular abutment 29 attached to the outer member 5 moves the grid annulus 14 so that the sealing pad 18 moves clear of the annular plug 8 so that oil may flow past the annulus 14 and into a space formed between the sealing pad and the plug and from thence through the clearance space provided between the rod and the plug and into the sump 4a. Thus when the shock absorber is fitted to a motorcycle operated over rough road surfaces the sump is automatically replenished when the strut is extended on rebound. Full replenishing is assured by the occasional manual extension of the shock absorber.

When it is necessary to provide topping-up oil this operation is carried out as follows. The screw-threaded end plug 7 is removed and topping-up oil is poured through the bore of the cap 6. The oil flows through the holes 24 in the annular disc 23 and into the cup-shaped reservoir 25. After filling the reservoir the oil flows through the overflow slots 27 provided in the reservoir into the space 21 provided between the outer member and the rubber cushioning element. The oil flow is continued until the level of oil rises to the height of the oil level hole 35 provided in the outer member. The shock absorber is then extended so that the sealing pad 16 moves clear of the plug 8 and the topping-oil pours into the sump as just described.

The cup-shaped oil reservoir referred to in the foregoing description, provides in effect, an oil passage between the space formed between the supporting member and the cushioning element, when compressed, and the space between the cushioning element and the outer member so as to allow the transference of oil from the sump to the bearing.

In an alternative embodiment not illustrated, however, the cup-shaped reservoir is replaced by an annulus forming a clearance fit on the supporting rod and provided with four equally spaced and radially extending ribs. This assembly functions as a spacing member, the rubber cushioning element abutting the annulus and being spaced from the disc abutment, earlier referred to, by means of the radially extending ribs. Oil may flow through a space formed between the annulus and the rod and between the ribs into the space formed between the outer member and the cushioning element.

An alternative embodiment of the invention will now be described which comprises a shock absorber illustrated in Figure 3 and suitable for the rear suspension strut of a motor cycle.

The shock absorber comprises telescopic cylindrical inner and outer members 35 and 36, the remote ends of the cylindrical members each having a mounting lug (37 or 38) rigidly attached thereto, each lug being provided with a hole drilled therethrough normal to its longitudinal axis. The lug 38 attached to the outer member is provided with an oiling nipple 39 through which oil can be fed to the inside of the outer member as will be more particularly described in a later part of the specification.

The end of the inner member 35 within the outer member 36 is provided with an external screw-thread having a cap 40 screwed thereon, provided with a coaxial hole 40a. The outer peripheral surface of the cap is adapted to slide on the inside wall 41 of the outer member and is provided with four axially extending grooves 42 extending for the whole length thereof. Thus the inner member is spaced apart from the wall of the outer member by the thickness of the peripheral wall of the cap.

An annular bearing member 43 is rigidly attached to the inside wall of the outer member and is located between the cap 40 and the end of the outer member 36, this bearing also serving to retain the inner and outer members in spaced apart relationship.

An outer annular rubber seal 44 and an inner annular rubber seal 45 are located one on each side of the bearing 43, the outer seal 44 abutting the extreme end of the outer member and being held in position by means of a portion 46 of the seal which fits into a corresponding annular groove 47 formed on the inner wall of the outer member. The bore of the outer rubber seal is provided with annular lips 48 and 49, one at each end, which project towards the inner member so as to contact the surface thereof. The bore of the rubber seal between the lips stands proud of the surface of the inner member. The inner seal 45 is held in position by means of an annular spring 50 sprung against the inner wall of the outer member, the rubber being flared so that an annular flared portion 51 extends towards the cap 40.

One end of a supporting rod 52 screw threaded at both ends, fits into a tapped hole formed coaxially in the lug 38 attached to the outer member and extends coaxially through the outer member, through the hole formed in the cap, forming a clearance fit therewith, and into the inner member. An axially extending flat portion 53 is provided on the rod and extends from a point adjacent to the lug to a point adjacent to the cap.

The portion of the supporting rod extending into the inner member carries a tubular rubber buffer 54, one end face of which abuts a radially extending face of the cap. The buffer 54 is held in position on the end of the supporting rod by means of a nut 55, a washer 56 being interposed between the nut and the rubber buffer.

The chamber formed between the cap 40 and the lug 37 attached to the inner member forms an oil sump 57 the operation of which will be more particularly described later in the specification.

A metal pressing in the form of a cup-shaped reservoir 58, located coaxially within the outer member with the rim thereof abutting the end of the lug 38 attached to the outer member, is provided with walls which taper inwardly towards the base 59 of the cup, which is provided with a clearance hole 60 through which the suporting member 52 projects. The rim of the reservoir fits closely against the inside wall of the outer member and two diametrically opposite substantially rectangular cutaway portions 61 are formed adjacent to the rim of the reservoir and extend about one third of the way down its wall.

A tubular rubber cushioning element 62 is mounted on the supporting rod 52, the inside diameter of the cushioning element before fitting on the rod being smaller than the diameter of the rod, so that when fitted the element tightly grips the rod. The outside diameter of the cushioning element 62 is less than the inside diameter of the outer member 36 so that an annular clearance space 63 formed between the element 62 and the outer member 36. One end face of the cushioning element abuts the base 59 of the reservoir 58 and is adhered thereto, the other end face of the cushioning element being adhered to a radially extending face of the cap 40.

During assembly of the parts of the shock absorber, the sump 57 is filled with a suitable lubricating oil, the cup-shaped reservoir also being filled with the same type of lubricating oil through the oiling nipple 39.

The shock absorber is attached to a motor cycle so that when the rear wheel of the motor cycle is displaced upwards, the inner and outer members of the shock absorber will telescope. This compresses the cushioning element 62, the axial length of the element decreasing and the inside diameter of the element increasing so that an annular clearance space is formed between the wall of the supporting rod and the inside wall of the cushioning element. Simultaneously the rubber buffer 54 and a portion of the supporting rod 52 move axially into the oil sump 57, the supporting rod displacing oil from the sump into the annular clearance space formed between the rod 52 and the compressed cushioning element 62. At the same time oil will flow from the reservoir 58 into this annular clearance space.

Recovery of the shock absorber causes the rubber cushioning element 62 to extend and the annular clearance space to contract. Simultaneously the rubber buffer 54 moves towards the cap. The combined effect of these movements, i. e. the pumping effect of the buffer and the expelling effect of the contraction of the clearance space, is to cause the oil contained in the annular clearance space to be delivered into the reservoir so that the level of the oil therein returns to its initial position and excess oil runs out of the reservoir through the cutaway portions 61 formed in the rim thereof into the annular clearance space 63. The oil then falls by gravity down the annular clearance space 63 and runs through the four axially extending grooves 42 formed on the outer periphery of the cap. After passing through the cap the oil runs into the bearing 43 past the inner annular rubber seal 45 and provides lubrication therefor. The inner seal 45 limits the amount of oil which can flow into contact with the bearing, the operation of this seal being to wipe the outside wall of the inner member.

The inner lip 49 of the outer rubber seal 44 prevents oil from flowing past the bearing 43 while the outer lip 48 prevents foreign bodies, e. g. mud and grit, from entering the bearing.

It will be noted from the foregoing description of the shock absorbers illustrated in the accompanying drawings that both the rubber cushioning element and the shock absorber bearings are lubricated from a single source which can be replenished as described.

If the rubber parts of the shock absorbers are made from natural rubber, then a lubricating oil must be used which will not damage the rubber e. g. castor oil. The rubber parts may, however, be made from an oil-resistant synthetic rubber, e. g. a butadiene/acrylonitrile copolymer.

Having described our invention, what we claim is:

1. A shock absorber comprising inner and outer hollow-section telescopic members adapted to be connected to members subject to relative displacement, the members being maintained in spaced apart relationship by means of a bearing and the inner member constituting an oil sump, means for replenishing the sump, a floating supporting member located coaxially within the outer member and extending into the inner member through a clearance hole in the inner end thereof, a resilient element retained coaxially on the end of the supporting member located within the inner member and abutting the inner end thereof, a rigid annulus slidably mounted coaxially on the supporting member adjacent to the inner end of the inner member and making a clearance fit with the supporting and outer members the said annulus having means attached thereto for forming a seal against the said end of the inner member, an annular abutment for the annulus attached to the outer member adjacent to the annulus and between the inner and outer members, an end abutment fixed to the end of the supporting member remote from the end carrying the resilient element, a hollow-section rubber cushioning element forming a close fit around the supporting member and spaced apart from the inner surface of the outer member, the said element being located between the rigid annulus and the end abutment, and a rigid cup-shaped oil reservoir, the base of the reservoir being adjacent to the end of the cushioning element remote from the rigid annulus and having a clearance hole therein through which the supporting member projects and the rim of the reservoir contacting the end abutment and having an overflow leading to the space between the element and the inner wall whereby when said hollow section telescopic element is moved inwardly in said outer hollow section telescopic element and said supporting element moves into said inner hollow section telescopic element to displace oil therefrom and said hollow section rubber cushioning element is compressed so that a space is formed between itself and the supporting member said oil may flow from the sump to the bearing through the bore of the cushioning element, the reservoir and the overflow.

2. A shock absorber according to claim 1 wherein the rigid annulus is provided on one side with a recess for accommodating the sealing means and having a second recess on its other side for accommodating an end of the cushioning element, the said annulus forming a clearance fit in the outer member and having an axially extending groove of gradually increasing depth extending from a point just short of the cushioning element recess to the end remote therefrom.

3. A shock absorber according to claim 1 wherein the means for replenishing the sump comprises an opening provided in the end of the outer member remote from the inner member, the said opening being provided with a screw-thread and a screw-threaded slug therefor whereby oil may be supplied to the reservoir through the opening and through a passageway provided in the end abutment.

4. A shock absorber according to claim 1 wherein the supporting member comprises a rod and wherein the profile of the rod and the profile of the cushioning element co-operate when the element is compressed to form an axially extending passageway leading from one end of the element to the other.

5. A shock absorber according to claim 1 wherein the length of the rubber cushioning element when assembled is less than its free length whereby said element is placed under compression.

References Cited in the file of this patent

UNITED STATES PATENTS

| | | |
|---|---|---|
| 1,581,490 | McKaig | Apr. 20, 1926 |
| 1,918,698 | Gruss | July 18, 1933 |
| 2,379,388 | Thornhill | June 28, 1945 |
| 2,574,420 | Seddon | Nov. 6, 1951 |